United States Patent [19]

Bourekas et al.

[11] Patent Number: 5,386,579
[45] Date of Patent: Jan. 31, 1995

[54] MICROPROCESSOR TRANSMITTING BYTE ENABLE SIGNALS ON MULTIPLEXED ADDRESS/DATA BUS HAVING BURST ADDRESS COUNTER FOR SUPPORTING SIGNAL DATUM AND BURST TRANSFER MODES

[75] Inventors: Philip A. Bourekas, San Jose; Avigdor Willenz, Campbell; Yeshayahu Mor, Cupertino; Danh LeNgoc, Saratoga; Scott Revak, Castro Valley, all of Calif.

[73] Assignee: Integrated Device Technology, Inc., Santa Clara, Calif.

[21] Appl. No.: 760,794

[22] Filed: Sep. 16, 1991

[51] Int. Cl.6 ............... G06F 12/00; G06F 15/76
[52] U.S. Cl. .................. 395/800; 395/425; 364/925.6; 364/960.2; 364/232.8; 364/232.9; 364/238; 364/251.3; 364/DIG. 1
[58] Field of Search ............... 395/800, 325, 425, 400

[56] References Cited

U.S. PATENT DOCUMENTS

| | | | |
|---|---|---|---|
| 4,315,308 | 2/1982 | Jackson | 395/325 |
| 4,349,870 | 9/1982 | Shaw et al. | 395/800 |
| 4,443,864 | 4/1984 | McElroy | 395/325 |
| 4,626,985 | 12/1986 | Briggs | 395/800 |
| 4,853,848 | 8/1989 | Mitsuhashi et al. | 395/425 |
| 5,073,969 | 12/1991 | Shoemaker | 395/725 |
| 5,086,407 | 2/1992 | McGarity et al. | 395/800 |
| 5,109,332 | 4/1992 | Culley | 395/325 |
| 5,131,083 | 7/1992 | Crawford et al. | 395/275 |
| 5,134,699 | 7/1992 | Aria et al. | 395/425 |
| 5,187,783 | 2/1993 | Mansfield et al. | 395/425 |
| 5,261,064 | 11/1993 | Wyland | 395/400 |
| 5,263,141 | 11/1993 | Sawaki | 395/425 |

Primary Examiner—Thomas G. Black
Assistant Examiner—Paul Harrity
Attorney, Agent, or Firm—Skjerven, Morrill, MacPherson, Franklin & Friel

[57] ABSTRACT

A multiplexed address and data bus system provides a minimum pin count with byte enable and burst address counter support. The partitioning of the address bus includes separate byte enables to indicate specifically which bytes of the word are being accessed, and two independent address lines which can function as a counter to support the burst refill. Both block reads or single datum transfers are handled similarly: a single addressing phase with multiple data phases; and all addresses in the memory system; are derived directly from the same pins regardless of whether it is a block read or not. The system allows for low cost packaging while maintaining a variety of system capabilities.

14 Claims, 6 Drawing Sheets

MINIMUM PIN-COURT MULTIPLEXED ADDRESS/DATA BUS WITH BYTE ENABLE AND BURST ADDRESS COUNTER SUPPORT MICROPROCESSOR TRANSMITTING BYTE ENABLE SIGNALS ON MULTIPLEXED ADDRESS/DATA BUS HAVING BURST ADDRESS COUNTER FOR SUPPORTING SIGNAL DATUM AND BURST TRANSFER

BACKGROUND OF THE INVENTION

1. Field of the Invention

This invention relates to digital systems and microprocessors, and more particularly to multiplexed address/data bus schemes for digital systems that minimize pin count.

2. Description of the Relevant Art

Microprocessors have wide spread applications in the electronics industry. Manufacturers have reduced the cost of microprocessors by providing low-cost packaging, and one way of providing low-cost packaging is by reducing the number of pins needed to connect the microprocessor to external circuitry.

One commonly known method of reducing pin count involves the use of time multiplexed address and data buses. In such a bus scheme, the same set of pins is used to carry address information in one phase of the transaction, and data information in another phase. Typically, an electrical component such as a microprocessor which uses such a bus structure also includes a control signal, ALE, to allow the bus to be demultiplexed externally.

However, for a number of reasons, more than just the address of the transfer is needed when performing a bus operation. In the least, the size of the transfer must be provided; for example, to differentiate between writing a byte, halfword, or fullword at a given address.

There are a number of traditional approaches to this problem. One approach is to encode the size of the transfer on dedicated pins and let external logic decode the bytes of the bus which are involved in the transfer. The other method is to have the processor decode the size of the transfer and provide dedicated byte strobes. The advantage to this approach is that these strobes can be directly used in the memory control system without external logic as required in the other approach. The disadvantage of this approach is that four pins are required for the byte strobes.

An additional complication may occur with microprocessors if it is desired to process certain types of reads of a plurality of adjacent words. For example, it may be desirable to read four adjacent four byte words. For many microprocessors, the order of the words in such quad reads is always the same; for example, word 0 of the block followed by word 1 followed by word 2 and ending with word 3.

When this type of read occurs, the memory system must respond with the appropriate four words in the correct order. Thus, the word within block address lines at the memory must function as counter. When this is done externally with an external counter, additional chips are required. Moreover, if this is done on a typical multiplexed bus, a net loss of performance occurs since a block read required four addressing phases for four data phases.

Although multiplexed buses have been available in previous microprocessors, such microprocessors do not include a burst address counter or byte enables. It is desirable for cost and performance to provide a minimum pin count multiplexed address/data bus microprocessor system with byte enable and burst address counter support.

SUMMARY OF THE INVENTION

A multiplexed address and data bus system in accordance with the present invention provides a minimum pin count with byte enable and burst address counter support. The partitioning of the address bus includes separate byte enables to indicate specifically which bytes of the word are being accessed, and two independent address lines which can function as a counter to support the burst refill. Both block reads or single datum transfers are handled similarly: a single addressing phase with multiple data phases; and all addresses in the memory system; are derived directly from the same pins regardless of whether it is a block read or not. A system in accordance with the present invention allows for low cost packaging while maintaining a variety of system capabilities.

These and other advantages are achieved by the present invention, in accordance with which a microprocessor having a multiplexed address and data bus comprises an execution core for processing data and for controlling the transfer of data, an address count logic coupled to the multiplexed address and data bus for providing a counting function during a burst mode of the execution core, and a byte lane decoder coupled to the multiplexed address and data bus for providing byte transfer information to an external memory.

The invention will be more readily understood with reference to the drawings and the detailed description. As will be appreciated by one skilled in the art, the invention is applicable to multiplexed address/data bus systems in general, and is not limited to the specific embodiment disclosed.

DETAILED DESCRIPTION

The following includes a detailed description of the best presently contemplated mode for carrying out the invention. The description is intended to be merely illustrative of the invention and should not be taken in a limiting sense.

Figure 1:
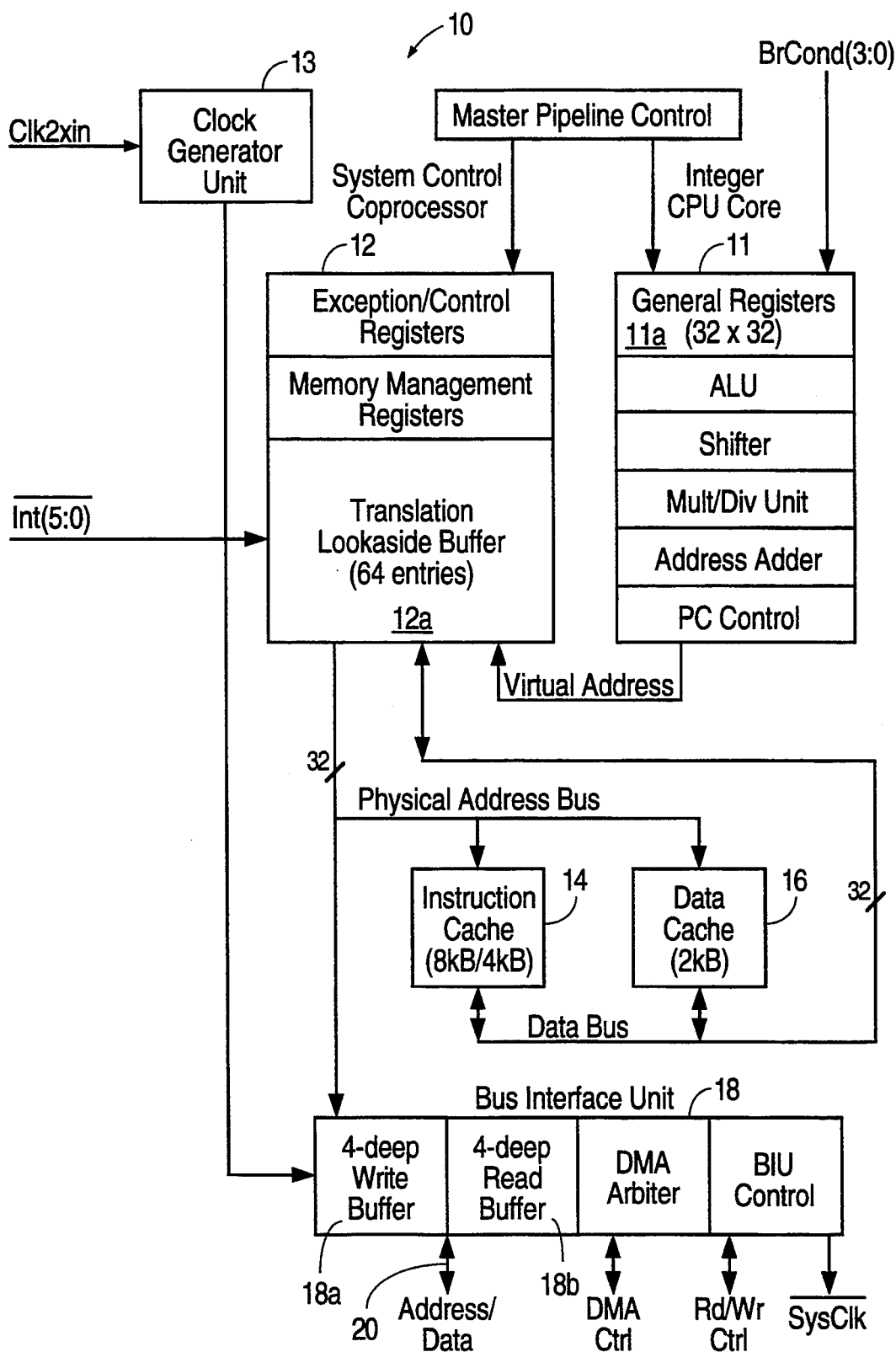
FIG. 1 is a block diagram of a microprocessor system that incorporates a multiplexed address/data bus system in accordance with the present invention.

Referring first to FIG. 1, a block diagram of a microprocessor 10 is shown that incorporates a multiplexed address/data bus system in accordance with the present invention. A CPU core 11 is a full 32-bit RISC integer execution engine capable of sustaining close to single cycle execution rate. The CPU core 11 contains a five stage pipeline, and 32 orthogonal 32-bit registers 11a.

An on-chip system control co-processor 12 manages both exception handling capability as well as virtual to physical mapping. The virtual to physical mapping includes kernel segments which are hard mapped to physical addresses, and kernel and user segments which are mapped page by page by a translation lookaside buffer 12a into anywhere in the four gigabyte physical address space. In this translation lookaside buffer, eight pages can be locked by the kernel to insure deterministic response in real time applications. The microprocessor is driven from a single. double frequency input clock. A clock generator unit 13 is responsible for managing the interaction of the CPU core 11, caches and bus interface.

An instruction cache 14 is organized with a line size of 16 bytes (four entries). The relatively large cache achieves hit rates in excess of 95 percent in most applications, and substantially contributes to the performance inherent in the microprocessor. The cache 14 is implemented as a direct mapped cache, and is capable of caching instructions from anywhere within the four gigabyte physical address space. The cache 14 is implemented using physical addresses (rather than the virtual addresses), and thus does not require flushing on context switch.

An on-chip data cache 16 of two kilobytes is organized as a line size of four bytes (one word). As with the instruction cache 14, the data cache 16 is implemented as a direct mapped physical address cache. The cache 16 is capable of mapping any word within the four gigabyte physical address space.

The data cache 16 is implemented as a write through cache to insure that main memory is always consistent with the internal cache. In order to minimize processor stalls due to data write operations, a bus interface unit 18 incorporates a four-deep write buffer 18a which captures address and data at the processor execution rate, allowing it to be retired to main memory at a much slower rate without impacting system performance.

A 32 bit address and data bus 20 is multiplexed onto a single set of pins. The bus interface unit 18 also provides an ALE (address latch enable) output signal to de-multiplex the address/data bus 20, and simple handshake signals to process CPU read and write requests. The four-deep write buffer 18a is incorporated to de-couple the speed of the execution engine from the speed of the memory system. The write buffers capture processor address and data information in store operations, and present it at the output of the bus interface 18 as write transactions at the rate the memory system can accommodate. In addition to the write interface 18a, a DMA arbiter 20c is incorporated to allow an external master to control the external bus.

A read interface performs both single datum reads and quad word reads. Single datum reads work with a simple handshake, and quad work reads can either utilize the simple handshake (in lower performance, low cost systems) or utilize a tighter timing mode when the memory system can burst data at the processor clock rate. Thus, the system designer can choose to utilize page or nibble mode DRAMs (and possibly use interleaving, if desired) in high performance systems, or use simple techniques to reduce complexity and cost.

In order to accommodate slower quad word reads, a four-deep read buffer FIFO 20b is incorporated so that the external interface can queue up data within the processor before releasing it to perform a burst fill of the internal caches.

Figure 2:
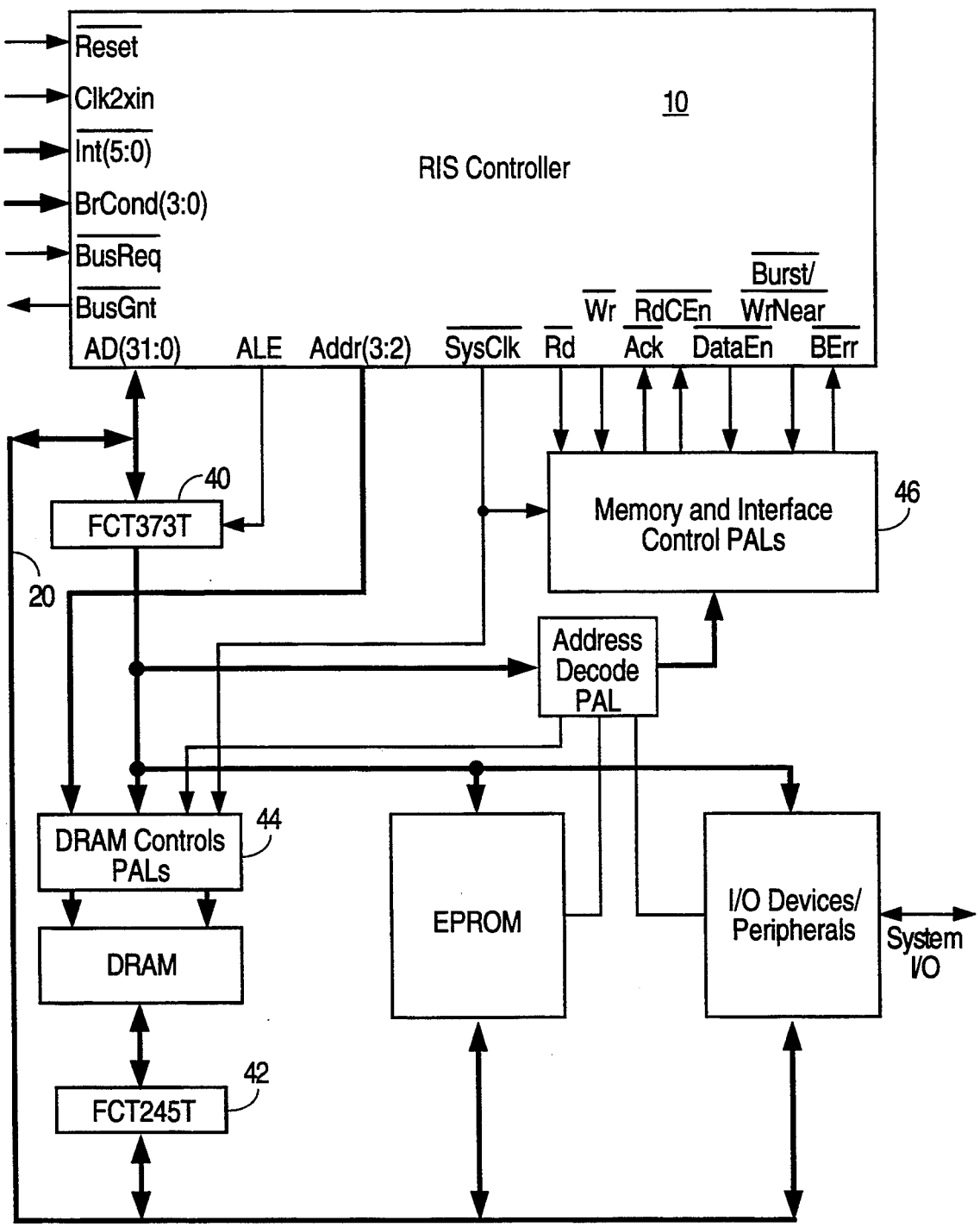
FIG. 2 is a block diagram of a typical system implementation of the microprocessor.

FIG. 2 shows a typical system implementation of the microprocessor of FIG. 1. Transparent latches 40 and 42 are used to de-multiplex the address and data buses from the AD bus 20. The data path between the memory system elements and the microprocessor bus is managed by simple octal devices. Small sets of simple PALs 44 and 46 are used to control the various data path elements, and to control the handshake between the memory devices and the microprocessor.

Depending upon the costs versus performance trade offs appropriate to a given application, the system designer could include true burst support from the DRAM to provide for high performance cache processing, or utilize a simpler lower performance memory system to reduce cost and simplify the design.

The 32-bit time multiplexed AD bus 20 indicates the desired address for a bus transaction in one cycle, and is used to transmit data between this device and external memory sources on other cycles.

Bus transactions on AD bus 20 are logically separated into two phases: during the first phase, information about the transfer is presented to the memory system to be captured by transparent latch devices using the ALE output. This information consists of:

Address(31:4): The high-order address for the transfer is presented.

$\overline{BE}$(3:0); These strobes indicating which bytes of the 32-bit bus will be involved in the transfer. $\overline{BE}$(3) indicates that AD(31:24) is used; $\overline{BE}$(2) indicates that AD(23:16) is used; $\overline{BE}$(1) indicates that AD(15:8)is used; and $\overline{BE}$(0) indicates that AD(7:0) is used.

During write cycles, the bus contains the data to be stored and is driven from the internal write buffer 18a. On read cycles, the bus receives the data from the external resource, in either a single word transaction or in a burst of four words, and places it into the on-chip read buffer 18b.

Addr (3:2) is a two bit bus which indicates the word which is currently expected by the processor. Specifically, this two bit bus presents either the address bits for the single datum to be transferred (writes or single datum reads) or functions as a two bit counter starting at "00" for burst read operations.

The address latch enable (ALE) is used to indicate that the A/D bus contains valid address information for the bus transaction. This signal is used by external logic (transparent latches) to capture the address for the transfer.

The types of read transactions will next be explained. The majority of the execution engine read requests are never seen at the memory interface, but are rather satisfied by the internal cache resources of the processor. Only in the cases of uncacheable references or cache misses do read transactions occur on the bus.

In general, there only two types of read transactions: quad word reads and single datum reads. Note that partial word reads of less than 32-bits can be thought of as a simple subset of a single word read, with only some of the byte enable strobes asserted.

Quad word reads occur only in response to cache misses. All instruction cache misses are processed as quad word reads; data cache misses may be processed as quad word reads or single word reads, depending on the mode selection made during reset initialization of the device.

In processing reads, there are two parameters of interest. The first parameter is the initial latency to the first word of the read. This latency is influenced by the overall system architecture as well as the type of memory system being addressed; i.e., time required to perform address decoding, and perform bus arbitration, memory pre-charge requirements, and memory control requirements, as well as memory access time. The initial latency is the only parameter of interest in single word reads.

The second parameter of interest (only in quad word refills) is the repeat rate of data; that is, the time required for subsequent words to be processed back to the processor. Factors which influence the repeat rate include the memory system architecture, the types and speeds of devices used, and the sophistication of the memory controller. Memory interleaving, the use of page or static column mode, and faster devices all serve to increase the repeat rate (minimize the amount of time between adjacent words).

The system accommodates a wide variety of memory system designs, including no wait state operations (first word available in two cycles) and true burst operation (adjacent words every clock cycle), through simpler, slower systems incorporating many bus wait states to the first word and multiple clock cycles between adjacent words (this is accomplished by use of the on-chip read buffer).

The read interface uses the following signals as listed in Table I.

TABLE I

A/D (31:0)
During read operations, this bus is used to transmit the read target address to the memory system, and is used by the memory system to return the required data back to the processor. Its function is de-multiplexed using other control signals.
During the addressing portion of the read transaction, this bus contains the following:
    Address(31:4)    The upper 28 bits of the read address are presented on A/D (31:4).
    $\overline{BE}$-(3:0)    The byte strobes for the read transaction are presented on A/D(3:0).
ALE
    This output signal is typically connected directly to the latch enable of transparent latches. Latches are typically used to de-multiplex the address and Byte Enable information from the A/D bus.
Addr (3:2)
    The remaining bits of the transfer address are presented directly on these outputs. In the case of quad word reads, these pins function as a two bit counter starting at "00", and are used to perform the quad word transfer. In the case of single (or partial word) reads, these pins contain Address (3:2) of the transfer address.

Figure 3:
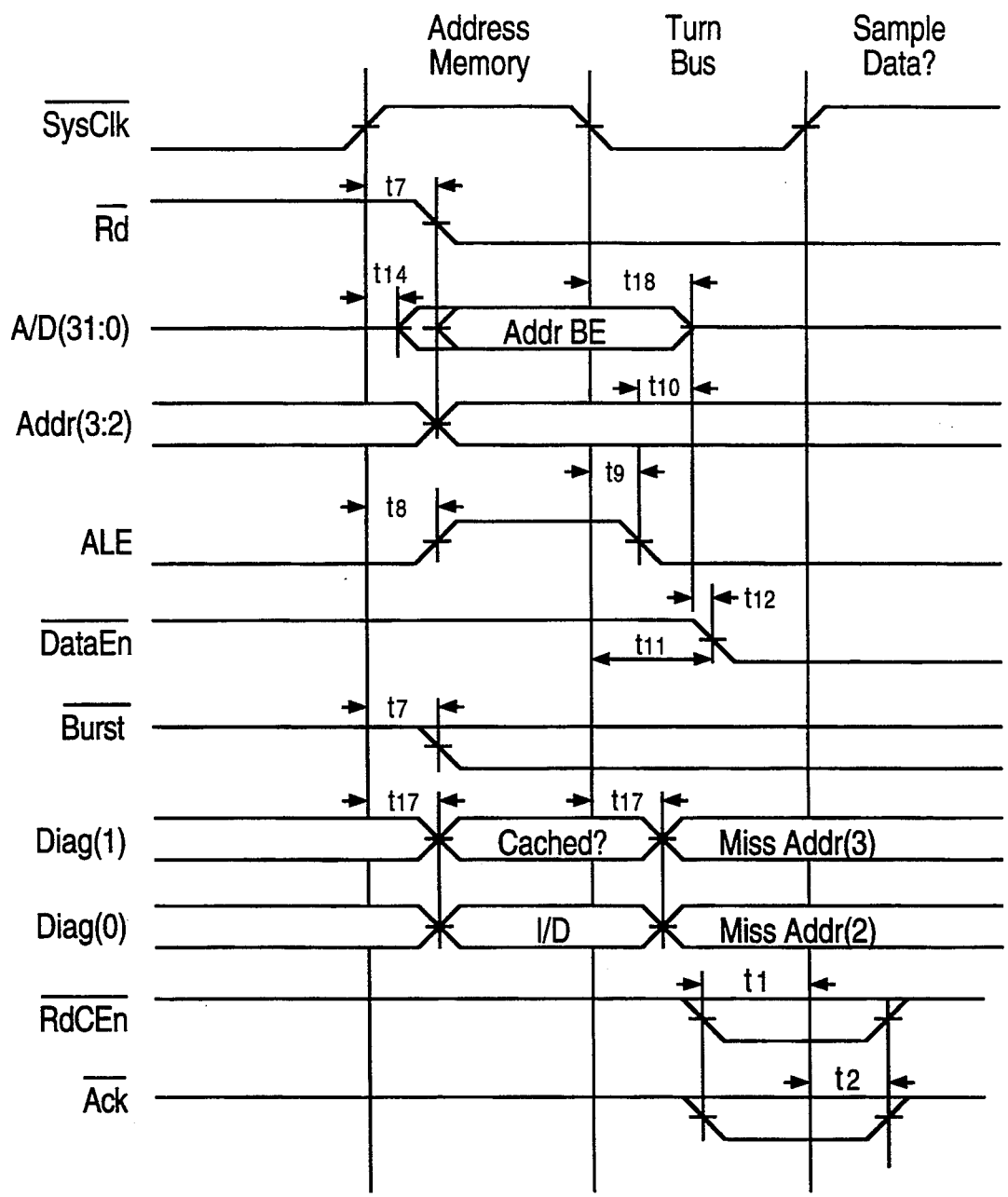
FIG. 3 is a timing diagram illustrating the start of a processor read transaction.

A read transaction begins when the processor asserts its $\overline{Rd}$ control output, and also drives the address and other control information onto the A/D and memory interface bus. FIG. 3 illustrates the start of a processor read transaction, including the addressing of memory and the bus turn around. The addressing occurs in a half-cycle of the $\overline{SysClk}$ output. At the rising edge of $\overline{SysClk}$, the processor will drive the read target address onto the A/D bus. At this time, ALE will also be asserted to allow an external transparent latch to capture the address. Depending on the system design, address decoding could occur in parallel with address de-multiplexing (that is, the decoder could start on the assertion of ALE, and the output of the decoder captured by ALE), or could occur on the output side of the transparent latches. During this phase, $\overline{DataEn}$ will be held high indicating that memory drivers should not be enabled onto the A/D bus.

Concurrent with driving addresses on the A/D bus, the processor will indicate whether the read transaction is a quad word read or single word read, by driving $\overline{Burst}$ to the appropriate polarity (low for a quad word read). If a quad word read is indicated, the Addr(3:2) lines will drive "00" (the start of the block); if a single word (or subword) is indicated, the Addr(3:2) lines will indicate the word address for the transfer.

Figure 4:
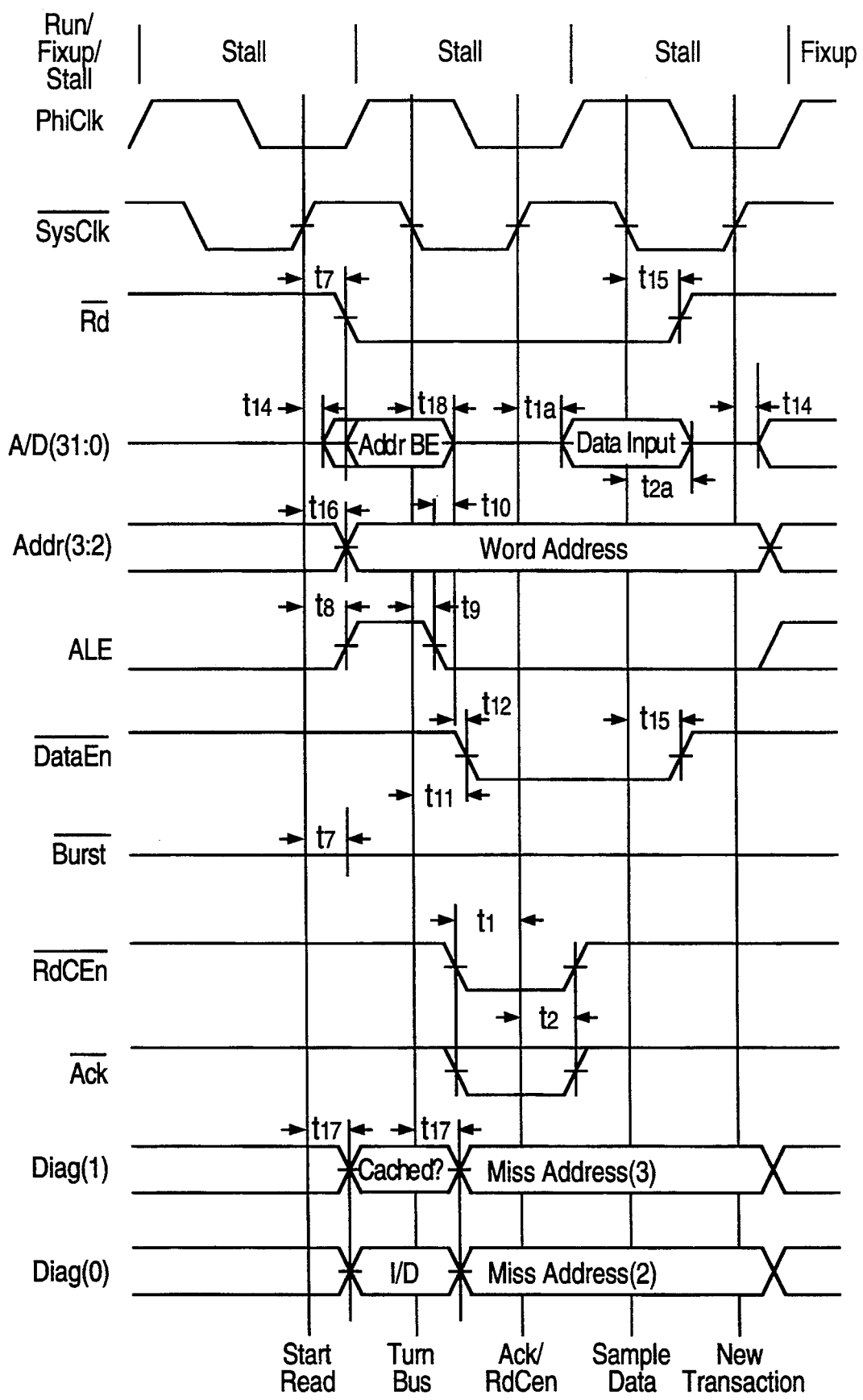
FIG. 4 is a timing diagram illustrating a single word read operation which does not require write states.

FIG. 4 illustrates the case of a single word read which did not require wait states. Thus, $\overline{Ack}$ was detected at the rising edge of $\overline{SysClk}$ which occurred exactly one clock cycle after the rising edge of $\overline{SysClk}$ which asserted $\overline{Rd0}$. Data was sampled one phase later, and $\overline{Rd}$ and $\overline{DataEn}$ disabled from that falling edge of $\overline{SysClk}$.

The write interface uses the following signals as listed in Table II.

TABLE II

A/D (31:0)
During write operations, this bus is used to transmit the write target address to the memory system, and is also used to transmit the store data to the memory system. Its function is de-multiplexed using other control signals.
During the addressing portion of the write transaction, this bus contains the following:
    Address(31:4)    The upper 28 bits of the write address are presented on A/D (31:4).
    $\overline{BE(3:0)}$    The byte strobes for the write transaction are presented on A/D(3:0).
During the data portion of the write transaction, the A/D bus contains the store data on the appropriate data lines, as indicated by the BE strobes during the addressing phase.
ALE
    This output signal is typically connected directly to the latch enable of transparent latches. Latches are typically used to de-multiplex the address and Byte Enable information from the A/D bus.
Addr (3:2)
    The remaining bits of the transfer address are presented directly on these outputs. During write transactions, these pins contain Address (3:2) of the transfer address.

Figure 5:
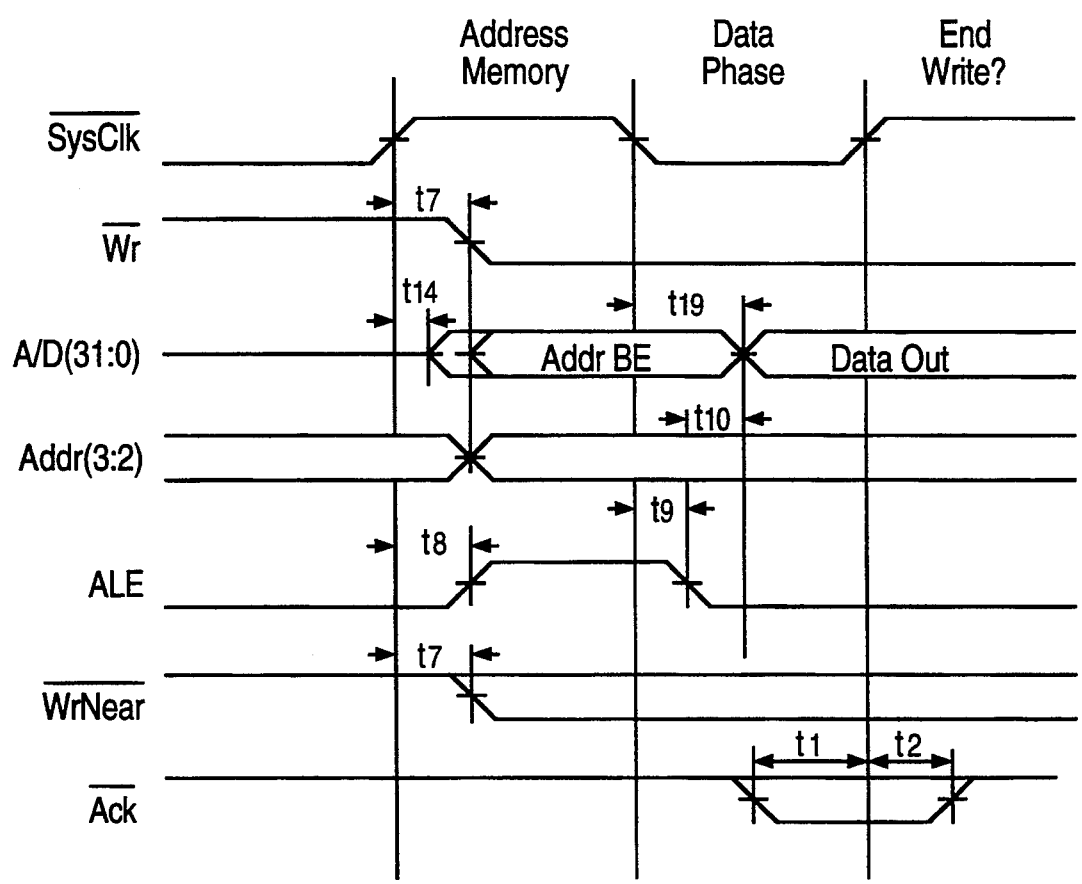
FIG. 5 is a timing diagram illustrating the start of a processor write transaction.

A write transaction begins when the processor asserts its $\overline{Wr}$ control output, and also drives the address and other control information onto the A/D and memory interface bus. FIG. 5 illustrates the start of a processor write transaction, including the addressing of memory and presenting the store data on the A/D bus.

The addressing occurs in a half-cycle of the $\overline{SysClk}$ output. At the rising edge of $\overline{Sysclk}$, the processor will drive the write target address onto the A/D bus. At this time, ALE will also be asserted, to allow an external transparent latch to capture the address. Depending on the system design, address decoding could occur in parallel with address de-multiplexing (that is, the decoder could start on the assertion of ALE, and the output of the decoder captured by ALE), or could occur on the output side of the transparent latches. During this phase, $\overline{WrNear}$ will also be determined and driven out by the processor.

Figure 6:
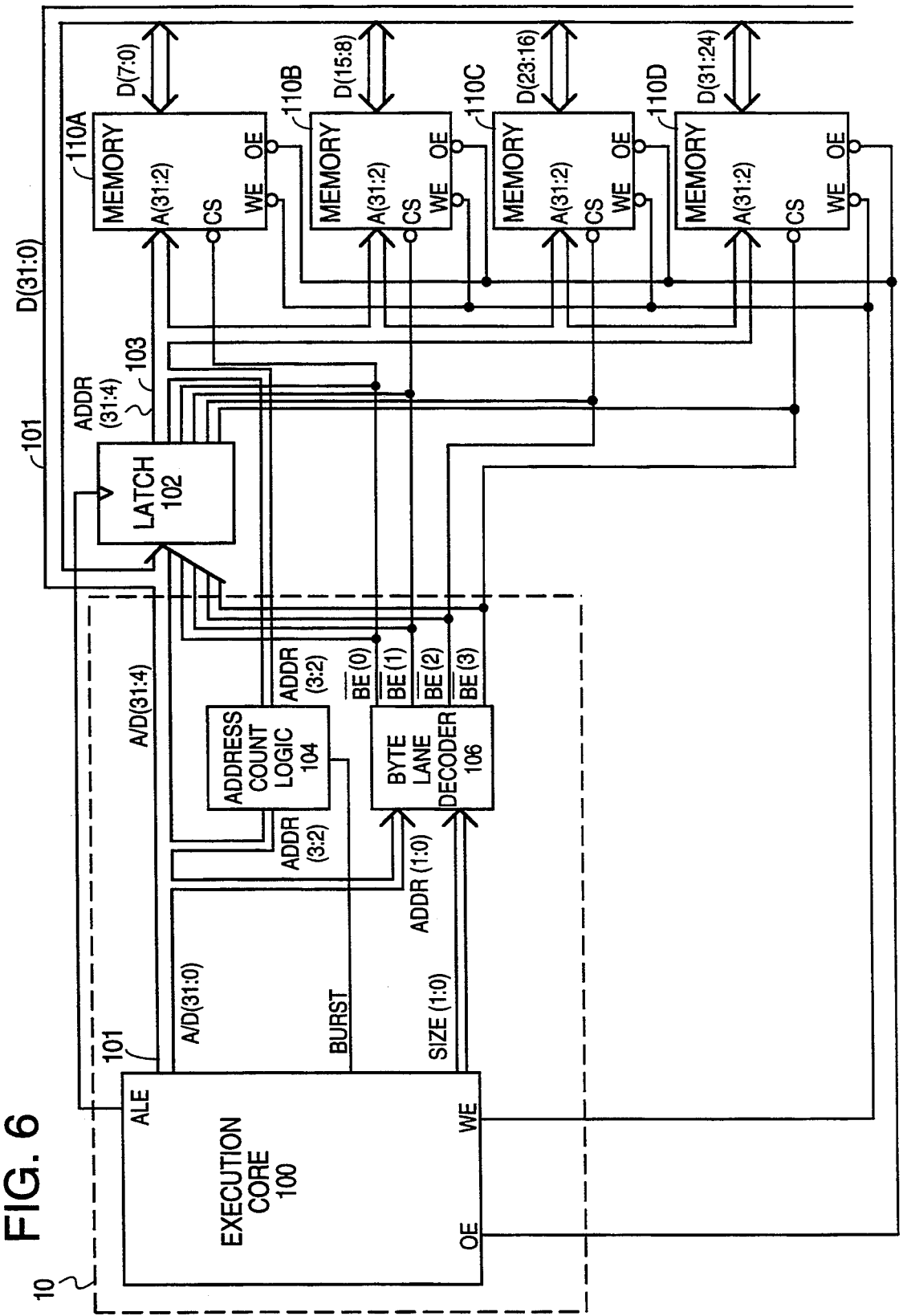
FIG. 6 is a block diagram of a microprocessor illustrating the structure of the multiplexed address/data bus with byte enable and burst address counter support in accordance with the present invention.

Referring next to FIG. 6, a block diagram of a portion of microprocessor 10 is shown that illustrates the various address and data buses as well as various control signals that interface to an external memory system consisting of memory elements 110a–110d. The execution core 100 within microprocessor 10 connects to a 32 bit multiplexed address and data bus 101. The execution core provides the address latch enable signal (ALE), the $\overline{\text{BURST}}$ signal, an output enable signal (OE) and a write enable signal (WE). Furthermore, a 2-bit bus labeled SIZE (1:0) is connected to the execution core 100 for providing datum transfer size information (i.e., the number of eight-bit bytes to be transferred during a particular cycle).

An external latch 102 is coupled to the execution core 100 through bus 101. Latch 102 provides the current addr (31:2) addressing signal to bus 103 in response to signal ALE. An address count logic block 104 supports burst operation. The address count logic block 104 connects to bits (3:2) (Addr (3:2)) of the address signal and allows direct coupling of these signals to its output bus 105 when burst mode is not asserted by the execution core 100. When the burst mode is enabled by the execution core 100 through assertion of signal $\overline{\text{BURST}}$, the address count logic block 104 serves as counter to generate burst address signals as previously explained in conjunction with FIG. 4.

A byte lane decoder 106 is coupled to bits (1:0) (addr (1:0)) of the addressing signal and to signal SIZE (1:0). The byte lane decoder 106 decodes these input signals and provides output signals labelled $\overline{\text{BE}}(0)$–$\overline{\text{BE}}(3)$. The byte enable signals are asserted low to select one or more of memory elements 110a–110d. The byte enable signals are asserted synchronously with the write enable (WE) or output enable (OE) signals to provide the appropriate bytes of data on the multiplexed bus 101 during the data state.

As a result of the internal organization of microprocessor 10, four external pins are required for the byte enable signals $\overline{\text{BE}}(0)$–$\overline{\text{BE}}(3)$, and 31 pins are required to address the memory system 110a–110d. Separate pins are not required to support burst operation due to address count logic 104. Thus, the microprocessor 10 provides a multiplexed address/data bus system with byte enable and burst address counter support and has a minimum number of associated external pins. Thus, packaging costs can be minimized without placing the burden of external logic on the system designer.

Other details of a specific embodiment of microprocessor 10 described above can be found in IDT 79R3051 Family Hardware Users Manual available from Integrated Device Technology, Inc., Santa Clara, Calif. 95054. This document is incorporated herein by reference in its entirety.

Numerous modifications and variations will become apparent to those skilled in the art once the above disclosure is fully appreciated. It is to be understood that the above detailed description of the preferred embodiment is intended to be merely illustrative of the spirit and scope of the invention and should not be taken in a limiting sense. The scope of the claimed invention is better defined with reference to the following claims.

We claim:

1. A microprocessor having a multiple-bit multiplexed address and data bus for transferring data to an external memory for a write operation and from the external memory for a read operation in a selected transfer mode, the transfer mode being selected from one of a burst mode and a single datum mode, the microprocessor comprising:

an execution core for processing data and for controlling the transfer of the data So the external memory for a write operation and from the external memory for a read operation, the execution core being coupled to the multiplexed address and data bus for sending data transfer control signals and for sending and receiving the data, the execution core generating a transfer mode signal indicative of the transfer mode;

address count logic coupled to receive a first subset of the bits of the multiplexed address and data bus and the transfer mode signal from the execution core and transmit a number of bits equal to the first subset of bits directly to the external memory, the address count logic providing a counting function in place of the first subset of bits to the external memory for a write operation and from the external memory for a read operation when the transfer mode signal indicates the burst transfer mode, and the address count logic providing the first subset of bits unmodified to the external memory when the transfer mode signal indicates the single datum mode; and a byte lane decoder coupled to receive a second subset of the bits of the multiplexed address and data bus, the second subset of bits including the data transfer control signals, wherein the byte lane decoder decodes byte transfer information from the data transfer control signals and provides the decoded byte transfer information to the multiplexed address and data bus, replacing the first and second subsets of bits.

2. The microprocessor as recited in claim 1 wherein the byte lane decoder further decodes a signal generated by the execution core identifying one or more bytes of the data to be transferred.

3. The microprocessor as recited in claim 1 wherein the address count logic disables the count function when the selected data transfer mode is the single datum mode.

4. The microprocessor in accordance with claim 1, wherein the multiplexed address and data bus includes 32 bits the first subset of bits coupled to the address count logic includes two bits of the multiplexed address and data bus, the second subset of bits coupled to the byte lane decoder includes two bits of the multiplexed address and data bus, and the decoded byte transfer information providing transfer information to the external memory includes four memory strobe lines.

5. The microprocessor in accordance with claim 1, wherein the multiplexed address and data bus comprises 32 bits, the first subset of bits coupled to the address count logic comprises two bits of the multiplexed address and data bus and the second subset of bits coupled to the byte lane decoder comprises two bits of the multiplexed address and data bus.

6. A microprocessor comprising:

a multiple-bit, multiplexed address and data bus, extending between an internal node and an external node, for communicating address information during an address cycle and for transferring data to an external memory for a write operation and from the external memory for a read operation during a data cycle;

an execution core coupled to the multiplexed address and data bus at the internal node for processing data and for controlling the transfer of the data to the external memory for a write operation and from the external memory for a read operation in a selected transfer mode, the transfer mode being selected from one of a burst mode and a single datum mode, the execution core generating a transfer mode signal indicative of the transfer mode and a byte transfer control signal indicative of a designation of the bytes to be transferred;

address count logic coupled to receive a first subset of the bits of the multiplexed address and data bus and the transfer mode signal from the execution core and coupled to transmit a number of bits equal to the first subset of bits directly to the external memory, the address count logic providing a counting function in place of the first subset of bits to the external node when the transfer mode signal indicates the burst mode, and providing the first subset of bits on the external node in place of the counting function when the transfer mode signal indicates the signal datum mode; and a byte lane decoder coupled to receive a second subset of the bits of the multiplexed address and data bus, the second subset of bits including the byte transfer control signal, the byte lane decoder decodes the byte transfer control signal to furnish byte enable signals on the external node in place of the first and second subsets of bits to designate the data bytes to be transferred on the multiplexed address and data bus during the data cycle.

7. The microprocessor in accordance with claim 6 wherein the execution core includes an output signal line for communicating the transfer mode signal, the address count logic being coupled to the transfer mode signal line and responsive to deassertion of the transfer mode signal when changing to the single datum mode.

8. A microprocessor for reading from a memory and writing to a memory, comprising:

a multiple-bit multiplexed address and data bus having an internal node and an external node, the bus being apportioned bitwise at the internal node into portions including a first address field, a second address field and a third address field, the bus being apportioned bitwise at the external node into portions including the first address field and a byte strobe field;

an execution core coupled to the multiplexed address and data bus internal node for controlling data transfers by setting an address signal and a byte enable signal on the internal node and by generating a transfer mode signal selected from one of a burst mode and a single datum mode, the address signal being apportioned bitwise into a first address portion and a second address portion, the first address portion which is placed on the internal node first address field and coupled to the external node first address field;

an address counter receiving the transfer mode signal and being coupled to the internal node second address field for receiving the second address portion, the address counter generating an output signal including the second address portion in the single datum mode and an address count in place of the second address portion in the burst mode; and a decoder coupled to the internal node third address field for receiving the byte enable signal and for decoding the byte enable signal into a plurality of byte strobe signals, and for coupling the plurality of byte strobe signals to the byte strobe field at the external node to designate bytes for transfer.

9. A microprocessor in accordance with claim 8, wherein the multiplexed address and data bus includes 32 bits, the internal node first address field and the external node first address field includes 28 bits of the multiplexed address and data bus, the internal node second address field comprises two bits of the multiplexed address and data bus, the internal node third address field includes two bits of the multiplexed address and data bus, and the external node byte strobe field includes four strobe lines.

10. A single-chip microprocessor comprising:

a multiple-bit multiplexed address and data bus for transferring data to an external memory for a write operation and from the external memory for a read operation in a selected transfer mode, the transfer mode being selected from one of a burst mode and a single datum mode, a first subset of bits of the multiplexed address and data bus extending to respective pins for interfacing to the external memory;

an execution core for processing data and for controlling the transfer of the data to the external memory for a write operation and from the external memory for a read operation, the execution core being coupled to the multiplexed address and data bus for sending data transfer control signals and for sending and receiving the data, the execution core generating a transfer mode signal indicative of the transfer mode;

address count logic having an input terminal coupled to receive a second subset of the bits of the multiplexed address and data bus and the transfer mode signal from the execution core and transmit a number of bits equal to the second subset of bits directly to the external memory and having an output terminal coupled to a plurality of pins for interfacing to the external memory, the address count logic providing a counting function in place of the second subset of bits to the external memory for a write operation and from the external memory for a read operation when the transfer mode signal indicates the burst transfer mode, and the address count logic providing the second subset of bits unmodified to the external memory when the transfer mode signal indicates the single datum mode; and a byte lane decoder for decoding byte transfer information from the data transfer and control signals, the byte lane decoder having an input terminal coupled to receive a third subset of the bits of the multiplexed address and data bus for receiving the data transfer and control signals and having an output terminal coupled to a plurality of pins for providing the decoded byte transfer information to the multiplexed address and data bus, replacing the second and third subsets of bits.

11. A microprocessor as in claim 10, wherein the multiplexed address and data bus interface includes pins for multiplexing between 32 bit data signals and 32 bit address signals including 28 bit high-order address signals and 4 decoded byte transfer information signals.

12. A method of communicating data between a processor and an external memory using a multiple-bit multiplexed address and data bus, comprising the steps of:

partitioning bits from the multiplexed address and data bus into a high-order field of bits, a medium-order field of bits and a low-order field of bits;

selecting data transfer control information including byte enable information, address information and a data transfer mode, the data transfer mode being selected from one of a burst mode and a single datum mode;

generating a transfer mode signal indicative of the data transfer mode, a byte select signal indicative of the byte enable information and an address signal indicative of address information designating an address in external memory for reading or writing data, the address information including high-order, medium-order and low-order address bits;

timing an address cycle of the multiplexed address and data bus;

during the address cycle:
applying the high-order address bits to the high-order field of bits of the multiplexed address and data bus and coupling the high-order field of bits of the multiplexed address and data bus to the external memory;

applying the medium-order address bits to the medium-order field of bits, and when the data transfer mode is the burst mode,
providing an address counting function in place of the medium-order address bits and coupling the address counting function directly to the external memory;

when the data transfer mode is the single datum mode,
providing the medium-order address bits unmodified and coupling the unmodified medium-order address bits directly to the external memory;

applying the byte select signal to the low-order field of bits of the multiplexed address and data bus;

coupling the low-order field of bits of the multiplexed address and data bus to a decoder to generate a plurality of byte strobe signals; and coupling the plurality of byte strobe signals to the external memory in place of the medium-order and low-order field of bits of the multiplexed address and data bus.

13. A method as in claim 12, further comprising the step of:
latching the high-order field of bits of the multiplexed address and data bus and the plurality of byte strobe signals to respectively demultiplex the address and the byte enable information from the multiplexed address and data bus.

14. A method as in claim 12, wherein the multiplexed address and data bus includes 32 bits, the high-order field of bits includes 28 bits, the medium-order field of bits includes two bits, the low-order field of bits includes two bits and the plurality of byte strobe signals include four signals.

* * * * *